United States Patent
Chapeau et al.

(10) Patent No.: US 11,072,296 B2
(45) Date of Patent: Jul. 27, 2021

(54) METHOD AND TOOL FOR MANUFACTURING A VEHICLE INTERIOR TRIM PART, AS WELL AS A VEHICLE INTERIOR TRIM PART

(71) Applicant: Faurecia Innenraum Systeme GmbH, Hagenbach (DE)

(72) Inventors: Lidia Chapeau, Karlsruhe (DE); Guillaume Basquin, Wissembourg (FR)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 290 days.

(21) Appl. No.: 15/994,909

(22) Filed: May 31, 2018

(65) Prior Publication Data
US 2018/0345879 A1    Dec. 6, 2018

(30) Foreign Application Priority Data
Jun. 2, 2017   (DE) ..................... 10 2017 209 457.5

(51) Int. Cl.
*B29C 45/14*    (2006.01)
*B60R 13/02*    (2006.01)
(Continued)

(52) U.S. Cl.
CPC ........ *B60R 13/02* (2013.01); *B29C 45/14811* (2013.01); *B29C 64/106* (2017.08);
(Continued)

(58) Field of Classification Search
CPC ................. B60R 13/02; B60R 13/0206; B29L 2031/302; B29L 2031/3041; B29C 70/78;
(Continued)

(56) References Cited

U.S. PATENT DOCUMENTS 6,441,338 B1 *  8/2002  Rabinovich ............... B26F 1/44
                                                             219/121.64
8,202,616 B2    6/2012  Suzuki et al.
(Continued)

FOREIGN PATENT DOCUMENTS

DE        19928235 A1     4/2000
DE     202006002835 U1    9/2006
(Continued)

OTHER PUBLICATIONS

Extended European Search Report issued in EP Application No. 18175285.8 [with Google machine translation], completed Oct. 17, 2018, 14 pages.
(Continued)

*Primary Examiner* — Nahida Sultana
(74) *Attorney, Agent, or Firm* — Faegre Drinker Biddle & Reath LLP

(57) ABSTRACT

The present disclosure relates to a method for manufacturing a vehicle interior trim part with at least one functional and/or decorative element. The functional and/or decorative element can be additively manufactured from a thermoplastic material and include a structured surface. The present disclosure further relates to a tool including a depositing unit and a receiving device with a receiving surface which is curved or at least partly structured.

10 Claims, 6 Drawing Sheets

(51) Int. Cl.
  *B33Y 80/00* (2015.01)
  *B29C 64/106* (2017.01)
  *B29C 70/78* (2006.01)
  *B29L 31/30* (2006.01)

(52) U.S. Cl.
  CPC .............. *B29C 70/78* (2013.01); *B33Y 80/00* (2014.12); *B29L 2031/302* (2013.01); *B29L 2031/3041* (2013.01); *B32B 2605/003* (2013.01)

(58) Field of Classification Search
  CPC ..... B29C 64/106; B29C 64/118; B29C 63/00; B33Y 80/00; B33Y 10/00
  See application file for complete search history.

(56) References Cited

U.S. PATENT DOCUMENTS

| | | | |
|---|---|---|---|
| 10,065,576 B2 | 9/2018 | Faik et al. | |
| 2009/0174121 A1* | 7/2009 | Hayes | B32B 21/08 264/447 |
| 2009/0201436 A1 | 8/2009 | Strazzanti | |
| 2009/0268278 A1 | 10/2009 | Suzuki et al. | |
| 2010/0144980 A1 | 6/2010 | Fujibayshi et al. | |
| 2011/0002138 A1* | 1/2011 | Hayes | B60Q 3/54 362/551 |
| 2011/0287230 A1 | 11/2011 | Akuzawa et al. | |
| 2012/0032592 A1* | 2/2012 | Breunig | B60Q 3/64 315/77 |
| 2014/0050886 A1 | 2/2014 | Burgin et al. | |
| 2014/0232035 A1* | 8/2014 | Bheda | B29C 64/165 264/148 |
| 2015/0099025 A1* | 4/2015 | Spalt | B33Y 30/00 425/166 |
| 2015/0291085 A1 | 10/2015 | Manning | |
| 2015/0321434 A1 | 11/2015 | Sterman et al. | |
| 2016/0075290 A1* | 3/2016 | Catlin | B41J 3/407 428/221 |
| 2016/0229991 A1 | 8/2016 | Diez Diaz et al. | |
| 2016/0280128 A1 | 9/2016 | Cannon | |
| 2016/0375843 A1 | 12/2016 | Faik et al. | |
| 2017/0037674 A1* | 2/2017 | Hooper | B33Y 10/00 |
| 2018/0050948 A1 | 2/2018 | Faik et al. | |
| 2018/0111569 A1 | 4/2018 | Faik et al. | |

FOREIGN PATENT DOCUMENTS

| | | |
|---|---|---|
| DE | 102013214108 A1 | 2/2015 |
| DE | 102014107098 A1 | 11/2015 |
| DE | 102014011230 A1 | 1/2016 |
| DE | 102015105694 A | 10/2016 |
| EP | 1305189 B1 | 5/2003 |
| WO | WO02057374 A1 | 7/2002 |
| WO | WO2015188017 A1 | 12/2015 |
| WO | 2016024029 A1 | 2/2016 |

OTHER PUBLICATIONS

German Search Report issued in DE Application No. 10 2017 209457.5 [with Google machine translation], dated Apr. 19, 2018, 20 pages.

* cited by examiner

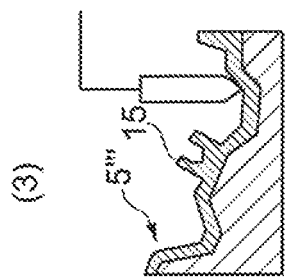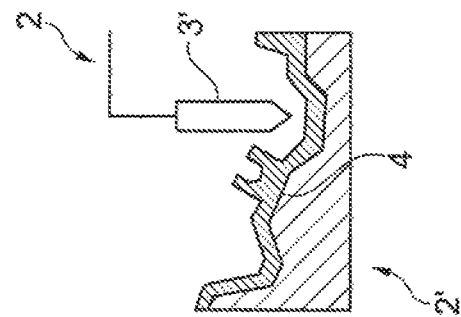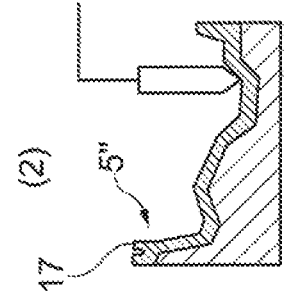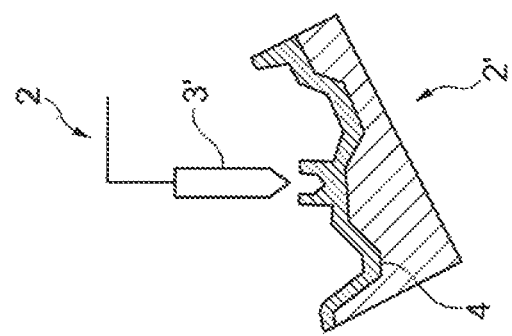
Fig. 3a    Fig. 3b
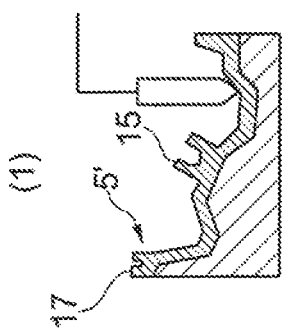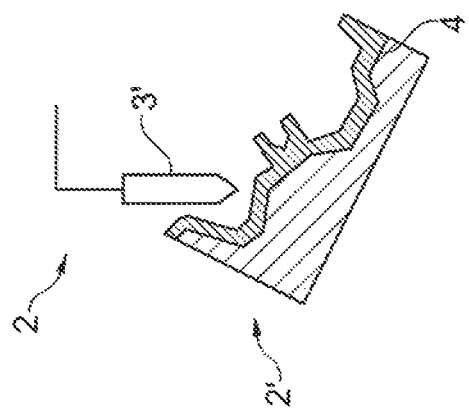

METHOD AND TOOL FOR MANUFACTURING A VEHICLE INTERIOR TRIM PART, AS WELL AS A VEHICLE INTERIOR TRIM PART

CROSS-REFERENCE TO RELATED APPLICATION

This application claims priority to German Application No. 10 2017 209 457.5, filed Jun. 2, 2017, which is herein incorporated by reference in its entirety.

TECHNICAL FIELD

The present application relates to a method for manufacturing a vehicle interior trim part with at least one functional and/or decorative element. The present application moreover relates to a tool for the manufacture of the vehicle interior trim part and to the vehicle interior trim part. Herein, the functional and/or decorative element preferably comprises a thermoplastic material.

BACKGROUND

Vehicle interior trim parts with thermoplastic functional elements or decor elements are typically manufactured by way of injection moulding methods. This however has the disadvantage of a costly mold construction of complex injection moulding shapes. In contrast, 3D printing methods permit a manufacture of almost arbitrary component shapes by way CAD models. The document DE 10 2014 011 230 A1 for example discloses a device for a three-dimensional additive printing operation, in particular for large-volume components which are printed by way of FDM (fused deposition modelling; melt layering). The known 3D printing methods however have the disadvantage of very long cycle times. In particular, the manufacture of large components by way of 3D printing methods implies long process times which cannot meet the demands for example of the automobile supplier industry, in which high numbers are manufactured per year.

SUMMARY

Departing from this state of the art, it is the object of the present invention to suggest an improved method for manufacturing a vehicle interior trim part. It is further an object of the invention to suggest a method which permits a simpler and/or less expensive manufacture of components. It is moreover an object of the invention to suggest a method which reduces cycle times for manufacturing a vehicle interior trim part with at least one functional element and/or decorative element. Furthermore, it is an object of the present application to suggest a correspondingly advantageous vehicle interior trim part as well as a correspondingly advantageous tool for manufacturing a vehicle interior trim part.

With regard to the suggested method for manufacturing a vehicle interior trim part which comprises a carrier part and a plastic element, a tool is firstly provided. The tool comprises at least one depositing unit for depositing a fluid, curable plastic and a receiving device with a receiving surface for receiving a carrier part. The carrier part is preferably manufactured beforehand by way of a method which permits a manufacture of relatively large parts in large quantities and at low costs. Injection moulding for example belongs to these methods. In some embodiments, the receiving surface comprises metal, particularly steel. Furthermore, the depositing unit and the receiving unit are movable relative to one another. The depositing unit and/or the receiving device can be movable along at least two, and in some embodiments, at least three axes and/or be rotatable about at least one, and in some embodiments, about at least two axes. Herein, in some embodiments, the receiving device is static and the depositing unit can be movable over several axes, and in some embodiments, over five axes, relative to the receiving device, for example by way of an industrial robot. It is also possible for the receiving device to be movable over one or more axes. Herein, movable can be understood as a translatory and/or a rotatory movement.

The carrier part has a front side and a rear side. The carrier part can be bent. The carrier part can be flexible. The front side and/or the rear side can further be arched and/or curved. Furthermore, the carrier part can comprise materials such as plastic, in particular PP or ABS or consist of these, and/or natural materials such as wood or metals such as for example aluminium. Alternatively or additionally, the carrier material can comprise glass, stone, a fabric or a fibre material or consist of these. The carrier part can comprise composite materials, for example polypropylene with natural fibres (NFPP) or a textile composite material.

In a further process step, the carrier part is laid onto the receiving surface in a manner such that the front side of the carrier part lies on the receiving surface at least regionally. The applied carrier part can therefore be held or supported by the receiving surface. In some embodiments, the receiving surface comprises a recess, into which the carrier part is inserted, so that it is secured against slippage. However, the carrier part can also be orientated, positioned and/or held on the receiving surface by way of arches or other shapes of the receiving surface and/or by way of vacuum. Herein, the shape of the receiving surface preferably corresponds at least regionally to the shape of the front side of the carrier part. Herein, in some embodiments, the receiving surface is curved. Herein, curved is to be understood as a surface which does not run in an exclusively planar manner, but can comprise deepenings and prominences. In some embodiments, these deepenings and prominences correspond at least regionally to the surface shape of the carrier part. If this carrier part is bent and/or the carrier part comprises an arched surface, then it can be positioned and/or orientated on the receiving surface in a predefined manner.

The receiving surface can be structured at least in regions. In particular, for forming the plastic part which is connected to the carrier part, the fluid, curable plastic can then be deposited at least regionally onto an outer edge of the carrier part and at least partly onto the structured receiving surface, in a manner such that the plastic element comprises a structured surface which corresponds to the structured receiving surface. Herein, corresponds in particular means that the structured surface of the plastic element represents a negative shape of the structured receiving surface, and in some embodiments the fluid plastic therefore negatively shapes the structured receiving surface. Herein, in some embodiments, the structured surface is designed as a negative of a template surface, so that the negative shaping of the structured surface in turn corresponds to the template surface.

Here, in particular, structured is to be understood in that the surface comprises deepenings in the form of troughs, grooves and/or furrows, which typically have depths of at least 10 µm, preferably minimally 50 µm and/or maximally 500 µm, preferably maximally 100 µm. On depositing the fluid, curable plastic onto the structured surface, the plastic penetrates into the troughs, grooves and/or furrows of the structured surface. After a curing of the plastic, the plastic forms a solidified negative of the structures surface and itself comprises a structured surface. Thus patterns, textures and/or surface roughnesses can be modelled on the template surface, and in particular surfaces of natural materials, for example of wood, stone and/or leather can serve as a template surface. A particularly decorative vehicle interior trim part can therefore be created by way of a structured surface of at least one plastic element.

In some embodiments, a through-hole and/or a through-bore which runs through the carrier part can be filled with a plastic element. A surface of the plastic element which is deposited in such a manner can moreover comprise a structured, decorative surface on the front side of the vehicle interior trim part, as described above. For this, the receiving surface can comprise the aforementioned structured surface in a region which is peripherally edged by the outer edge of the through-hole or the through-bore, of the carrier part which is placed on the receiving surface. On depositing the fluid, curable plastic into the through-hole or into the through-bore, the plastic penetrates into the troughs, grooves and/or furrows of the structured surface. After a curing of the plastic, the plastic forms a solidified negative of the structured surface. It is also possible to manufacture a frame which is materially connected to the carrier part and on the front side of the vehicle interior trim part comprises a structured surface which bears on the front side of the carrier part. As described above, the structured surface of the frame is created by way of depositing a fluid, curable plastic onto a structured surface of the receiving surface. In some embodiments, such a frame is an example of a functional element which is simultaneously decorative.

The fluid, curable plastic is deposited at least regionally onto the carrier part surface, for the generative manufacture of at least one plastic element which is materially connected to the carrier part. The carrier part surface can for example comprise and/or be a side surface, an edge, and/or the rear side. If the carrier part does not lie completely on the receiving surface with its front side, then the carrier surface, onto which the fluid or curable plastic is deposited, can also comprise or form regions of the front side of the carrier part.

The plastic cures after its deposition. Herein, a curing can be understood as solidification or also as a general firming or compacting. The deposited plastic can be cured for example by way of cooling, by way of evaporation of a solvent, by way of a chemical reaction of two components, by way of a polymerisation, for example a polymerisation by way of UV radiation, and/or a sintering.

In some embodiments, the vehicle interior trim part which is formed by the plastic element and the carrier part can be removed from the tool after the curing of the plastic.

The carrier part can be separately manufactured and can be injection moulded for example. This permits a rapid manufacture of the carrier part. The plastic elements are generatively deposited onto the carrier part in the suggested method. The suggested method therefore has the advantage of cycle times being shortened. In particular, process times are reduced compared to the generative manufacture of a complete vehicle interior trim part. Furthermore, the cost for a complex mold construction is minimised since the complex shapes of the plastic elements can be deposited generatively. The plastic elements can be for example hooks, projections for fixing the vehicle interior trim part, any holding elements, receiving elements for electronic components—for example switches, displays or lights—frames or other decorative elements. In some embodiments, clamp connections, clips, stiffening structures and/or screwing points are further plastic elements. Such electronic components and/or further components which are to be fixed to the carrier part by way of the plastic elements can, in some embodiments, be positioned in or on the carrier part even before the additive manufacture of the plastic part/plastic parts. Furthermore, decorative plastic elements in the form of plugs and/or ornamentations of holes in the carrier and/or on edges on the carrier part are conceivable. In particular, through-holes which are visible on the front side of the carrier part can be decorated and/or plugged with plastic elements.

The plastic element can be materially connected to the carrier part. In particular, a direct material connection can be created between a material of the carrier part and a material of the plastic element. However, an indirect material connection, for example via one or more layers which have been deposited onto the carrier part and onto which in turn the plastic element is deposited can be present. Thus for example an adhesive can be deposited at least regionally onto the carrier part surface, and one or more plastic elements can be generatively deposited onto the region or regions, having adhesive, which are formed in such a manner. In particular, this has the advantage of a material connection being able to be formed between the plastic element and the carrier part also in the regions of the carrier part which comprise materials such as wood or aluminium. The surface of the carrier part can be machined at least regionally, for example by flame or plasma, in order to improve the adhesion of the plastic element. Alternatively or additionally, the adherence or bonding can be improved by roughening and/or an adhesive primer can be used.

The fluid, curable plastic can be deposited in a layered manner, in particular by way of an additive manufacturing method, for example a FDM method or by way of 3D printing. Herein, the fluid, curable plastic can be deposited in droplets or strands.

The deposition in a layered manner may be carried out for example by depositing a meander shaped strand of the fluid, curable plastic or by depositing a number of parallel strands of the fluid, curable plastic in one plane next to one another. When the fluid, curable plastic is deposited in droplets, first, the droplets may be deposited next to each other in one plane such that on the carrier they may join to form one or more strands. The droplets may be deposited in such a manner that the strand formed by the droplets may have a meander shape or may be parallel strands. In turn, the strands may be arranged next to each other in such a manner that they join for forming a layer. In such a manner, a number of layers may be deposited one above the other. The fluid, curable plastic may be at least not completely cured or partially melted by the heat of the deposited, hot, fluid plastic, such that the layers and/or the droplets and/or the strands join together.

In embodiments, the plastic element forms a frame which at least partly peripherally edges the carrier part. Herein, the frame at a front side can comprise a structured surface which is formed by the method described above. Herein, the receiving surface preferably comprises a channel, which runs along an outer edge of the carrier part, said carrier part being arranged on the receiving surface. An inner side of the channel preferably comprises the structured surface. The fluid, curable plastic can be deposited in the channel along the outer edge of the carrier part in a layered manner, so that the frame which is materially connected to the carrier part is formed. The fluid, curable plastic can herein negatively shape the structured surface, so that the frame comprises a structured surface on the front side of the carrier part.

Alternatively or additionally, a plastic element can also be arranged on the rear side of the carrier part. It is particularly with plastic elements which are designed as holding elements (for example hooks or pins) and which are not to be visible at the front side that an arrangement of the plastic elements at the rear side of the carrier part is utilized.

The fluid, curable plastic is, in some embodiments, a thermoplastic, preferably polypropylene or acrylonitrile butadiene styrene. The fluid, curable plastic can consist of the same material or comprise the same material as the carrier part. A plastic with suitable mechanical characteristics is preferably applied for the holding elements. A runny, curable plastic which easily flows into the structured surface of the receiving part can be used for a structured edge.

The tool for manufacturing a vehicle interior trim part comprises at least one depositing unit for discharging the fluid, curable plastic and a receiving device for receiving a three-dimensional carrier part.

The depositing unit, in some embodiments, comprises a nozzle and/or an extruding head for depositing the fluid, curable plastic. Usually, a nozzle and/or an extruding head with a fixed, round outlet opening are used. The diameter of the outlet opening, through which the fluid, curable plastic exits from the nozzle and/or the extruding head can be changeable, for example by way of an iris diaphragm (shutter). Additionally or alternatively, the nozzle and/or the extruding head can have different cross sections of the outlet opening, for example the outlet opening can be triangular, oval, rectangular or square.

A vehicle interior trim part can be manufactured by way of the method which is described above and/or with the tool which is described above. Additional method steps can be provided. In some embodiments, the vehicle interior trim part is a dashboard, a vehicle door trim or a middle console. The features which are described above can herein also be features of the vehicle interior trim part. In particular, a vehicle interior trim part which comprises a carrier part and a frame which at least regionally peripherally edges the carrier part and is materially connected to the carrier part can be manufactured with the method which is described above. Herein, the vehicle interior trim part, in some embodiments, comprises a front side and the frame, in some embodiments, has a structured surface on the front side. Additionally or alternatively, the vehicle interior trim part can comprise plastic elements, for example hooks and/or projections, for example for fixing the vehicle interior trim part, on the rear side.

BRIEF DESCRIPTION OF THE DRAWINGS

Embodiment examples are hereinafter described by way of figures. There are shown in FIG. 1a a cross section of a tool with an inserted carrier part with plastic elements, according to embodiments of the disclosure;

FIG. 3a a cross section of the tool of FIG. 2 with different carrier parts, according to embodiments of the disclosure;

FIG. 3b a cross section of the tool of FIG. 3a with a movable receiving surface, according to embodiments of the disclosure;

DETAILED DESCRIPTION

Figure 1A:
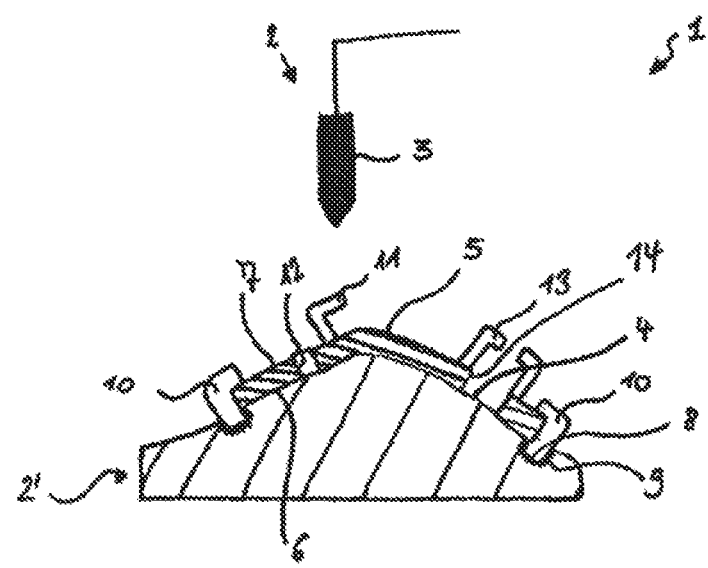
FIG. 1b a cross section of the tool with an inserted carrier part with plastic elements, according to embodiments of the disclosure.

FIG. 1a shows a tool 1 for manufacturing a vehicle interior trim part, according to embodiments of the disclosure. The tool 1 comprises a depositing unit 2 for depositing a fluid, curable plastic, from which the plastic elements can be formed according to the principle of FDM. For this, the depositing unit 2 comprises a movable nozzle 3, through which the fluid, curable plastic can be deposited in a targeted manner. The tool 1 moreover comprises a receiving device 2' with a receiving surface 4, on which a carrier part 5 comprising a front side 6 and a rear side 7 is arranged. The receiving surface 4 is curved and corresponds to the shape of the front side 6, so that the carrier part is arranged on the receiving surface in manner secure against slippage. The receiving surface 4 comprises a channel 8 which peripherally edges the carrier part. A surface 9 of the channel 8 is designed in such a structured manner that it depicts a negative shape of a wood surface structure. Herein, furrows with a depth between 50 and 100 µm, for example 70 µm are formed on the surface 9. Herein, the surface 9 is of steel. Plastic elements which have been generatively deposited onto the carrier part 5 through the nozzle 3 by way of FDM are arranged on the carrier part 5. Herein, the nozzle 3 was moved relative to the carrier part 5 and to the receiving surface 4 over five axes by way of an industrial robot. One of the deposited plastic elements is a frame 10 which is materially connected to the carrier part 5. A fluid, curable plastic was deposited in a layered manner into the channel 8 which runs around the carrier part 5, in a manner such that the frame encloses the carrier part 5 at the outer edges of the carrier part 5 as well as partly at the rear side 7 of the carrier part 5 and fills the channel 8, for forming the frame 10. After the curing of the plastic, the vehicle interior trim part which comprises the carrier part and the generatively deposited plastic element is removed from the tool 1. The frame 10, in the regions, in which the plastic which is fluid on depositing came into contact with the structured surface 9, comprises a structured surface which corresponds to a negative shaping of the structured surface 9. In these regions, the frame 10 therefore comprises a wood texture. Furthermore, a holding element in the form of a hook 11 is arranged on the carrier part 5. The hook 11 was generatively manufactured just as the frame 10, by way of fluid curable plastic having been deposited in a layered manner through the nozzle 3 by way of FDM. Furthermore, a through-bore 12 in the carrier part 5 was filled with fluid, curable plastic. A further holding element 13, as the hook 11, is generatively deposited on the rear side 7 of the carrier part 5, peripherally edging an opening 14. A display can therefore be attached behind the opening 14 of the carrier part 5 and be held by the holding element 13. Herein, the display is fixed relative to the carrier part by the holding element 13 and can be read or—if it is a touchscreen—operated, through the opening 14 from the front side.

The carrier part 5 is of PP and the fluid, curable plastic is ABS. The carrier part can also be of a different material and/or comprise a different material. The fluid, curable plastic can also be a different material, for example PP. The shown material combination has the advantage that the fluid plastic materially connects to the carrier part on deposition. If for example the carrier part is of wood, glass or aluminium, then an adhesive is deposited before the deposition of the plastic, and such an adhesive comprises for example polyam ides. The plastic is subsequently deposited onto the adhesive, so that a material connection arises between the plastic and the adhesive. The adhesive can be for example an adhesive primer or an adhesive film.

Figure 1B:
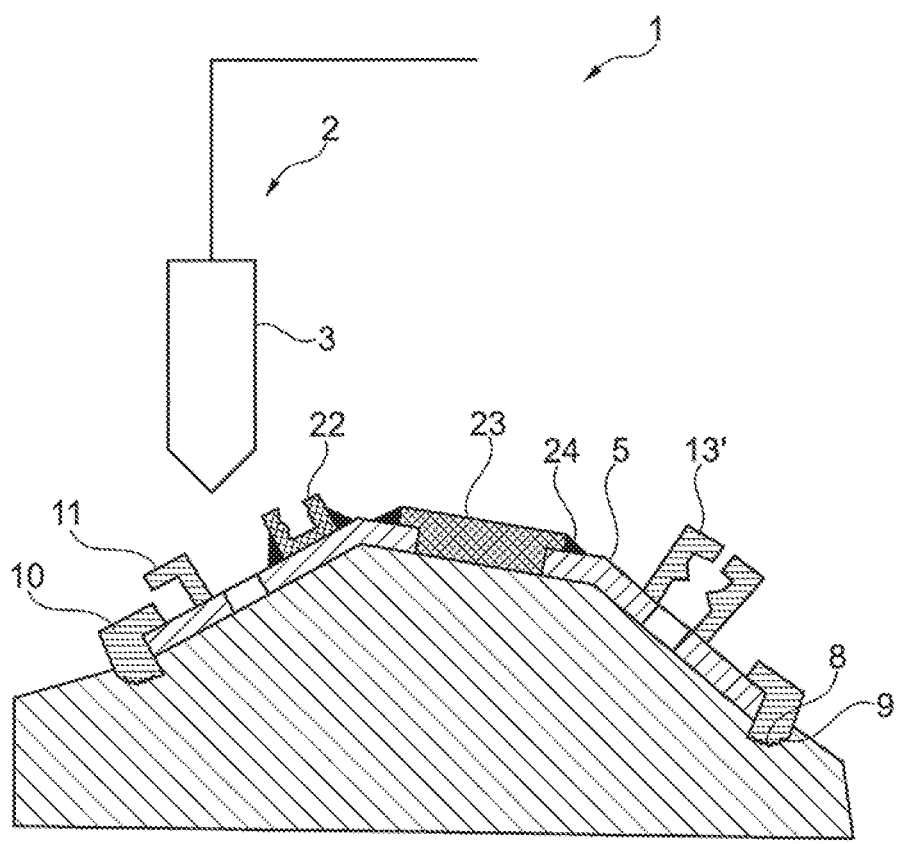

FIG. 1b essentially shows the tool of FIG. 1a, for manufacturing a vehicle interior trim part. The vehicle interior trim part, just as the vehicle interior trim part of FIG. 1a, comprises a carrier part 5 as well as plastic elements in the form of a hook 11, a frame 10 and a holding element 13'. The carrier part 5 is not designed as one piece with the plastic elements. In contrast, the carrier part 5 was manufactured before the additive deposition of the plastic elements and inserted separately into the tool 1. The holding element 13' has a shape with undercuts, so that it can only be manufactured by way of additive manufacture. A threaded element 22 is further connected to the carrier part 5. The threaded element 22 can be additively manufactured or be connected to the carrier part by way of additive manufacture and/or by way of an adhesive. Furthermore, a display 23 which was already arranged on the carrier part 5 before the deposition of the plastic elements by way of additive manufacture is provided in the shown example. A plastic element, here in the form of a display holder 24 can positively connect the display to the carrier element 5.

Figure 2A:
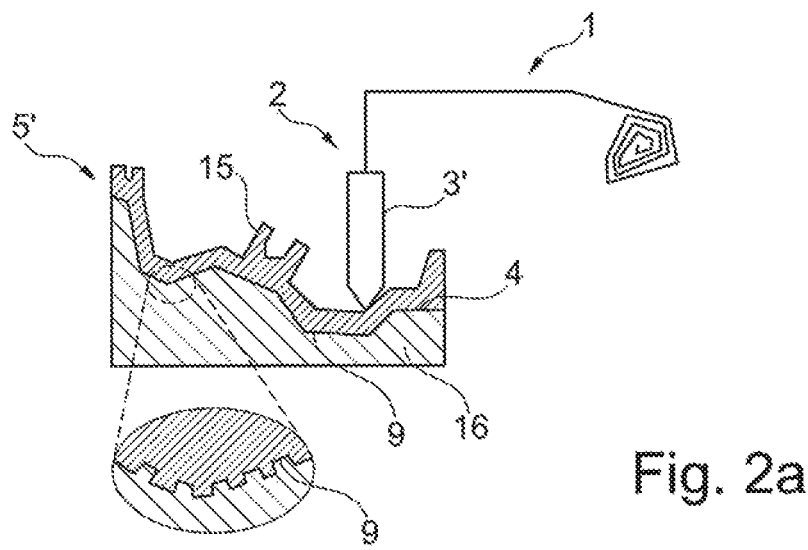
FIG. 2a a cross section of a tool and an enlarged detail of a structured surface, according to embodiments of the disclosure.

FIG. 2a shows a tool which corresponds essentially to the tool of FIG. 1, wherein the receiving surface 4 has a different shape. Recurring features are provided with identical reference numerals in this and in the following figures. Furthermore, the receiving surface 4 is not designed regionally as a structured surface as in FIG. 1, but is designed completely as a structured surface 9. This is represented in the enlarged detail of FIG. 2. In contrast to FIG. 1, no separately manufactured carrier part is arranged on the receiving surface 4. In contrast, the fluid, curable plastic is deposited directly onto the receiving surface 4 and itself forms a carrier part 5'. Herein, the fluid, curable plastic is deposited in strands firstly next to one another for forming a first layer. The plastic can also be deposited in droplets. Further plastic strands are arranged next to one another on the first layer for forming a further layer. In the shown example, the plastic is extruded through an extruding head 3'. The extruding head 3' herein comprises a circular outlet opening, so that the extruded plastic strands have an essentially circular shape. The carrier part 5' which is manufactured in such a generative manner has regions of a different thickness as well as functional elements, for example a fastening clip 15. Alternatively, the fastening clip can comprise a material which is different to that of the carrier part and can be deposited onto the carrier part. As is generally known from generative manufacturing methods, the carrier part thickness and also the shape of the functional elements are herein formed by way of layers which are regionally deposited in different numbers. The vehicle interior trim part with the carrier part 5' and the fastening clip 15 are removed from the tool 1 after a curing of the plastic. The carrier part 5' on its surface 16 comprises a structuring which corresponds to the structured surface 9 of the receiving surface, thus corresponds to the negative of the receiving surface 9. The material of the carrier part and the material of the plastic element can be manufactured by way of different nozzles. For example, in some embodiments, a nozzle with a larger exit opening which can be moved more quickly than the nozzle for the manufacture of the plastic element is used for the manufacture of the carrier part.

Figure 2B:
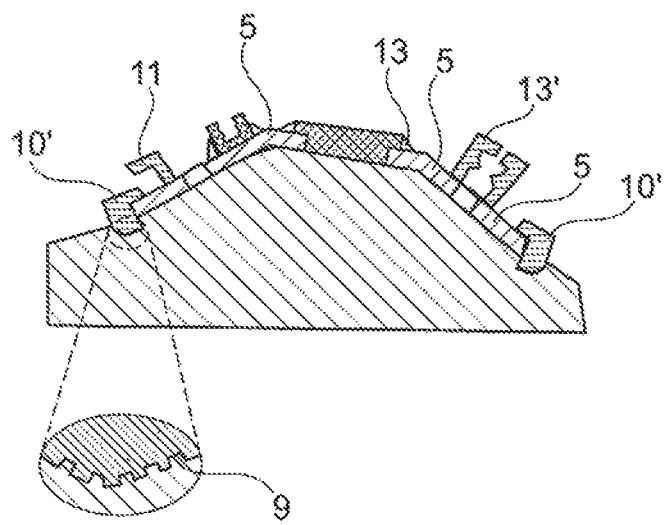
FIG. 2b a cross section of a tool and an enlarged detail of a structured surface, according to embodiments of the disclosure.

FIG. 2b shows a tool which corresponds essentially to FIG. 2a. A carrier part 5 is manufactured separately (in contrast to the carrier part which is inserted into the tool of FIG. 2a). In the shown example 2b, the carrier part is a plastic part, for example of PP, which after its manufacture was inserted into the tool 1. Plastic elements 10, 11, 13 and 13' were deposited onto the carrier part 5 in a layered manner at a later stage by way of FDM.

Figure 2C:
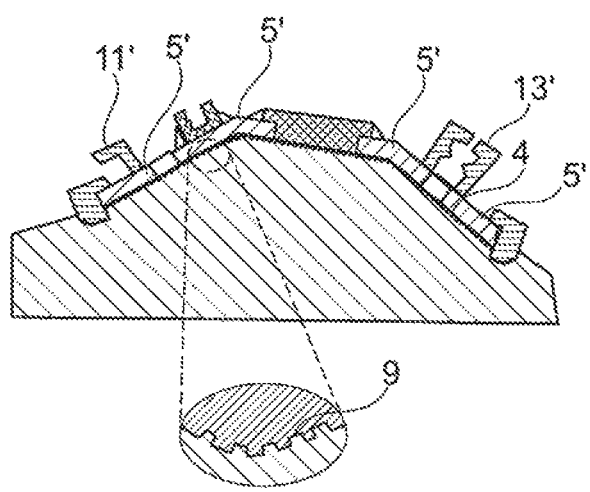
FIG. 2c a cross section of a tool and an enlarged detail of a structured surface, according to embodiments of the disclosure.

FIG. 2c shows a tool which corresponds essentially to FIG. 2b. However, in contrast to FIG. 2b, the receiving surface 4 is not formed regionally but completely as a structured surface 9. A carrier part 5' was additively deposited onto the receiving surface 4, so that a front side of the carrier part 5' comprises a structured surface. Furthermore, a holding element 13' with undercuts was further likewise additively deposited onto the carrier element 5'. A hook 11' was likewise deposited additively, this in a layered manner, onto the carrier part.

The tool of FIG. 2, with which vehicle interior trim parts having different designs and fashions can be manufactured, is shown in FIG. 3a. FIGS. 3a (1), (2) and (3) herein each show the same tool with different designs of the respectively manufactured carrier parts 5', 5" and 5'". Herein, the carrier part 5' corresponds to the carrier part of FIG. 2 and apart from the fastening clip 15 comprises a clamp part 17. The fastening clip 15 and the clamp part 17 are herein designed as one piece with the carrier part 5'. The carrier part 5" has no fastening clip 15, but a clamp part 17. Here too, the clamp part 17 is designed as one piece with the carrier part 5". The carrier part 5'" only comprises the fastening clip 15.

FIG. 3b shows the tool of FIG. 3a, wherein additionally to the depositing unit 2, the receiving device 2' is also movable relative to the depositing unit 2 over five axes by way of a further industrial robot. This is particularly advantageous if fluid, curable plastic is used which can be deposited in a defined manner exclusively in the direction of gravity, without running out.

Figure 3C:
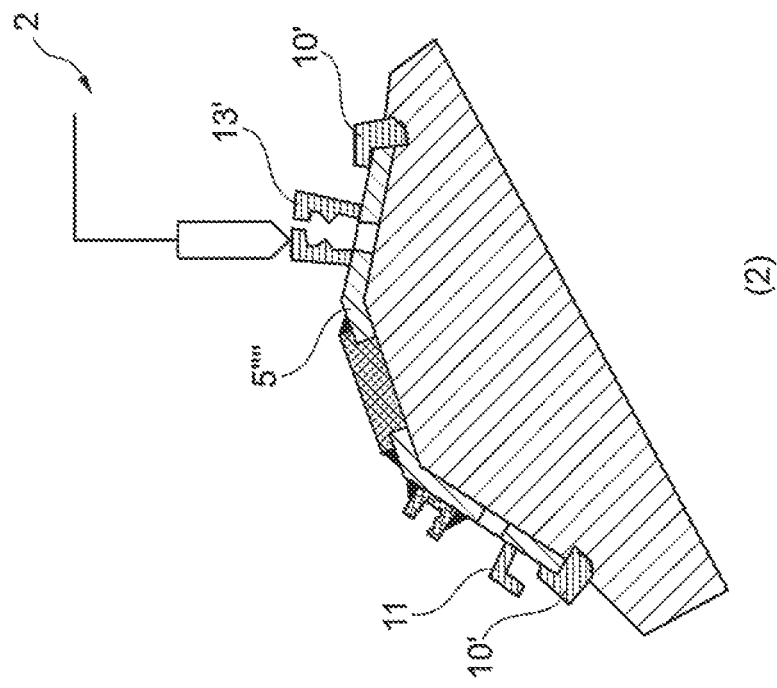
FIG. 3c a cross section of the tool of FIG. 3b with a movable receiving surface, according to embodiments of the disclosure.
Figure 3C:
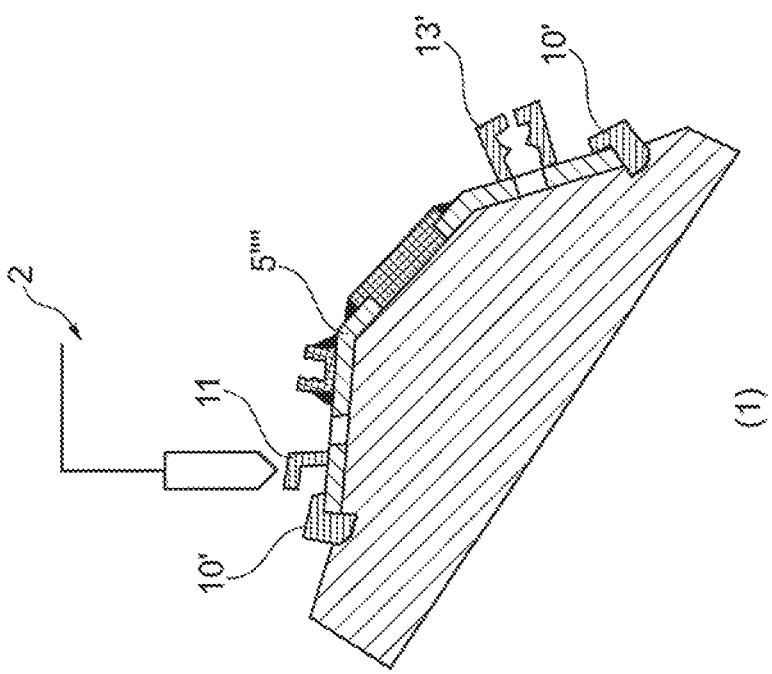

FIG. 3c shows how vehicle interior trim parts of different fashions can be manufactured with the tool of FIG. 3b. FIGS. 3c (1) and (2) herein show the tool with the carrier part 5". Herein, in contrast to the carrier part of FIG. 3a, the carrier part 5" is not designed as one piece with the plastic elements 10' (frame), 11 (hooks) and 13' (holding element). In contrast, FIG. 3c (1) shows a momentary picture shortly after an additive manufacture of the hook 11 which was deposited onto the separately manufactured carrier part 5". FIG. 3c (2) shows a momentary picture shortly after an additive manufacture of the holding element 13' which is deposited onto the carrier part 5". The carrier part 5" is for example of glass. An adhesive can be deposited onto the respective locations, at which the plastic elements 10', 11 and 13' of the carrier element are localised, before the depositing of the plastic elements 10', 11 and 13'. The plastic elements 10', 11 and 13' can subsequently be deposited in a layered manner onto the adhesive or directly onto the carrier surface, in an additive manner.

Figure 4:
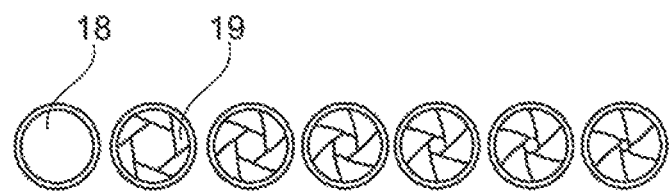
FIG. 4 an outlet opening of a nozzle with an iris diaphragm, according to embodiments of the disclosure.

FIG. 4 shows an iris shutter in different settings. An outlet opening 18 can be arbitrarily opened and closed by way of lamellae 19. An exit opening of a nozzle or of an extruding head 3' can be enlarged or reduced by way of such an iris shutter.

Figure 5:
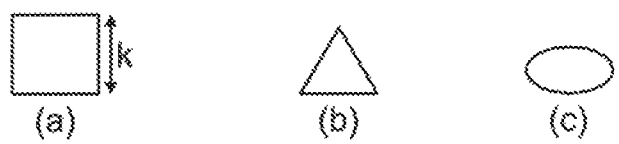
FIG. 5 cross sections of an outlet opening of a nozzle, according to embodiments of the disclosure.

Three different cross-sectional geometries which an outlet opening of a nozzle and/or of an extruding head 3' can have for example are shown in FIG. 5. Herein, the cross section in FIG. 5(a) is square, in FIG. 5(b) triangular and in FIG. 5(c) oval. The square of FIG. 5(a) herein has an edge length for example of 0.8 mm, the triangle of FIG. 5(b) has a height for example of 0.5 mm and the oval a length L for example of 7 mm. An extruding head 3' and/or a nozzle 3 of one of the aforementioned tools can comprise for example such a shape of the exit opening. Furthermore, one can envisage the cross-sectional geometries of the outlet openings being able to be changed for example by way of different attachments. Round outlet openings have a diameter for example of greater than 0.02 mm and less than 5 mm.

Figure 6:
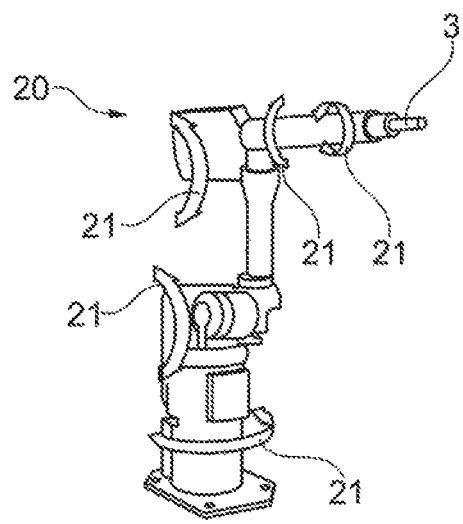
FIG. 6 an industrial robot for moving the nozzle, according to embodiments of the disclosure.

FIG. 6 shows an industrial robot 20, on whose arm a nozzle 3 is arranged. The industrial robot 20 is part of one of the aforementioned tools and part of the depositing unit 2. The nozzle 3 is movable in five directions 21 and can therefore realise any movement. Plastic elements with undercuts and complex shapes can therefore be additively manufactured.

It is to be noted that the terms additive manufacture, 3D printing and generative manufacture are used as synonyms in the present application.

Features of the different embodiments which are disclosed in the embodiment examples can be combined with one another and claimed individually.

We claim:

1. A method for manufacturing a vehicle interior trim part which comprises a carrier part and a plastic element, comprising the following steps:
    providing a tool comprising at least one depositing unit for depositing a fluid, curable plastic and a receiving device with a receiving surface for receiving a carrier part with a front side and with a rear side, wherein the at least one depositing unit and the receiving device are movable relative to one another;
    applying the carrier part onto the receiving surface in a manner such that the front side of the carrier part at least regionally lies on the receiving surface;
    at least regionally depositing the fluid, curable plastic onto the carrier part surface in a layered manner, such that at least one plastic element which is materially connected to the carrier part is generatively manufactured; and
    curing the plastic,
    wherein the receiving surface is structured at least regionally and the fluid, curable plastic is deposited at least regionally directly onto the structured receiving surface.

2. A method according to claim 1, wherein an adhesive is deposited onto the carrier part surface at least regionally, before the depositing of the fluid, curable plastic.

3. A method according to claim 1, wherein the receiving surface is structured at least regionally and for forming the plastic element which is connected to the carrier part, the fluid, curable plastic is deposited at least regionally onto an outer edge of the carrier part and onto the structured receiving surface in a manner such that the plastic element comprises a structured surface which corresponds to the structured receiving surface.

4. A method according to claim 1, wherein the fluid, curable plastic is deposited in a layered manner by way of an additive manufacturing method.

5. A method according to claim 1, wherein the fluid, curable plastic is deposited by a FDM method.

6. A method according to claim 1, wherein the fluid, curable plastic is deposited in droplets or strands.

7. A method according to claim 1, wherein the plastic element forms a frame which at least partly peripherally edges the carrier part and/or wherein the plastic element is arranged on the rear side of the carrier part.

8. A method according to claim 1, wherein the structured receiving surface comprises deepenings in the form of at least one of troughs, grooves and furrows.

9. A method according to claim 8, wherein the at least one of troughs, grooves and furrows have depths in a range of 10 μm to 500 μm.

10. A method according to claim 1, wherein the fluid, curable plastic is deposited in a layered manner by way of an additive manufacturing method at least regionally directly onto the structured receiving surface.

* * * * *